Nov. 7, 1961  G. A. HIDER  3,007,345
INTERMITTENT INDEX MECHANISM
Filed Feb. 15, 1960  2 Sheets-Sheet 1
FIG. 1
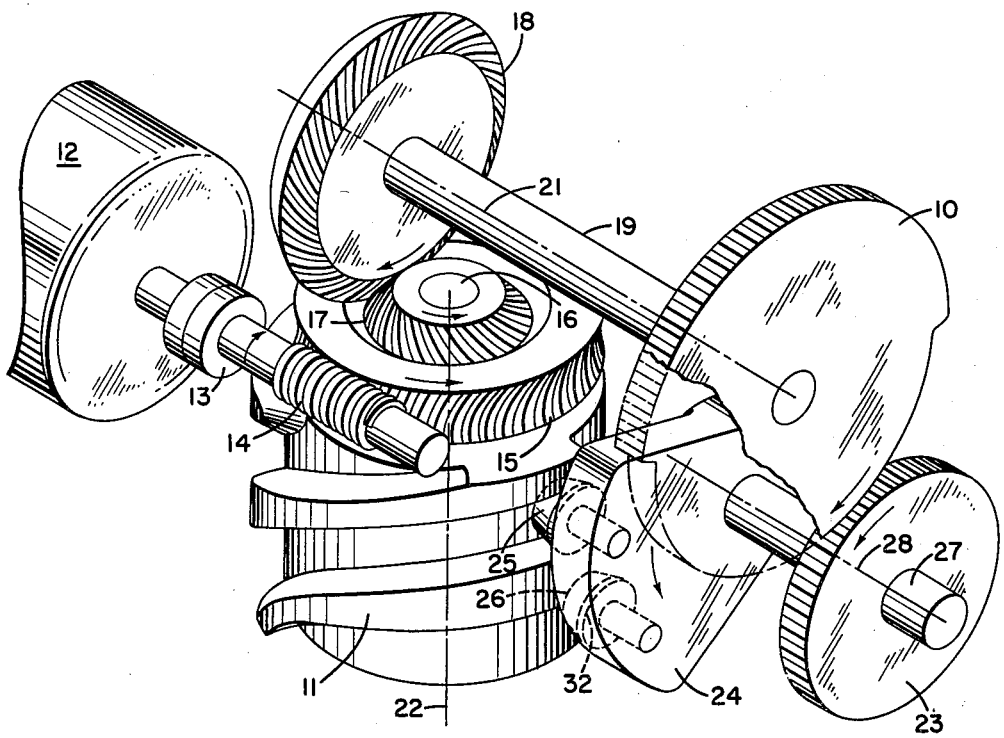
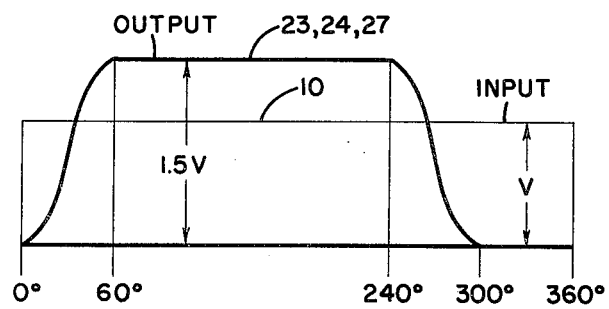
FIG. 2
INVENTOR.
GLENN A. HIDER
BY
Richard W. Treverton
ATTORNEY

United States Patent Office 3,007,345
Patented Nov. 7, 1961

3,007,345
INTERMITTENT INDEX MECHANISM
Glenn A. Hider, Penfield, N.Y., assignor to The Gleason Works, Rochester, N.Y., a corporation of New York
Filed Feb. 15, 1960, Ser. No. 8,719
12 Claims. (Cl. 74—393)

The present invention relates to an intermittent index mechanism, adapted especially but not exclusively for machine tools, such for example as gear cutting machines wherein such a mechanism may serve to periodically advance a work spindle angularly to bring successive tooth spaces of a work piece on the spindle into position for cutting.

A mechanism according to the invention comprises a drive gear, a cam, and a common drive for rotating them in constant velocity ratio; and a rotatable driven unit comprising a driven gear for mesh with the drive gear and a follower roller for engagement with the cam; one of said gears being a gear segment; the cam being of substantially drum shape and having about its peripheral surface a path for engagement by the follower during a portion of each revolution of the driven unit, the driven unit being so disposed relative to the cam that as it revolves the portion of the follower that is adjacent said peripheral surface during such engagement moves substantially in a plane tangent to said peripheral surface; the cam path being so shaped and related to the follower and the driven gear that during each operating cycle of the mechanism said cam path comes into engagement with the follower while the driven gear is in mesh with the drive gear, decelerates the driven unit to a standstill after the driven gear passes out of mesh with the drive gear, holds the driven unit stationary while the cam rotates through a certain angle, accelerates the driven unit to bring the driven gear to the same pitch line velocity as the drive gear by the time they again come into mesh, and then disengages the follower to enable further rotation of the driven unit by the drive gear.

One advantage of the invention is that the same cam which serves to intermittently advance the driven unit also serves to lock it until the next advance is begun, thereby eliminating need for a separate lock-up mechanism such as is usually required. Another advantage is that the cam is of such character and arrangement that it can be designed to provide for smooth acceleration of the driven unit from a standstill to maximum velocity and, subsequently, smooth deceleration back to a standstill. Another advantage is that the driven unit is enabled to rotate through one complete turn during each index operation, thereby avoiding the gearing-up that is sometimes necessary with index mechanisms wherein the driven unit makes only a partial turn during each cycle. Yet other advantages are that the index may be driven in either direction; and that it is simple and rugged. A dwell portion of the cam is utilized to lock the driven unit of the mechanism between its intermittent indexing motions, and this dwell portion preferably has a considerable extent so that insofar as accuracy of indexing is concerned the mechanism is insensitive to any irregularities of the drive motion applied to it.

The foregoing and other features and advantages will appear from the following description of the preferred embodiment of the invention shown in the accompanying drawings, wherein:

FIG. 1 is an isometric view of the mechanism;

FIG. 2 is a diagram showing the relative velocities of the drive gear and driven unit throughout one cycle of operation;

Figure 4:
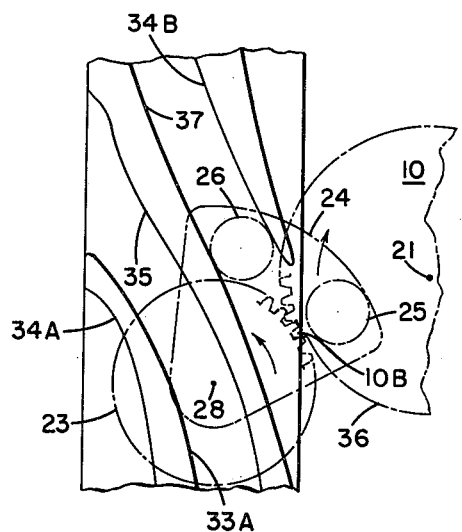
FIG. 4 is a view showing a fragment of the structure shown in FIG. 3, in a different phase of operation.

The mechanism comprises a drive gear 10, a drum shaped cam 11 and a common drive for rotating them in constant velocity ratio. This common drive includes an electric motor 12 whose armature or drive shaft is connected by coupling 13 to a worm 14 which meshes with a worm wheel 15. The latter is secured to a shaft 16 upon which are also secured the cam 11 and a bevel pinion 17, the pinion being disposed in a recess in the upper end face of the worm wheel for compactness. A gear 18 driven by the pinion is secured to a shaft 19 upon which the drive gear 10 is secured. The tooth number ratio of gears 17, 18 is such that the drive gear 10 makes one turn for each two turns of cam 11. The axis 21 of gears 10, 18 and shaft 19 intersects at right angles the axis 22 of shaft 16, cam 11, worm wheel 15 and pinion 17.

Figure 5:
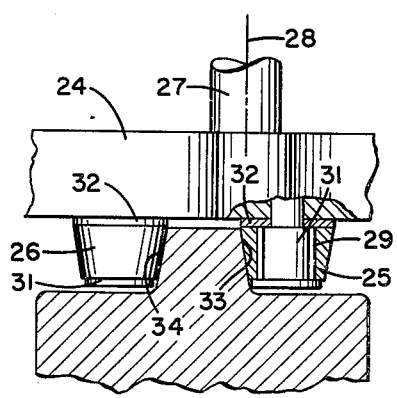
FIG. 5 is a fragmentary sectional view in plane 5—5 of FIG. 3.

The rotatable driven unit of the mechanism comprises a driven gear 23 adapted for mesh with drive gear 10 and a cam follower 24 having conical rollers 25 and 26 engageable with the cam 11. In the embodiment illustrated the drive gear is a gear segment having twenty-seven teeth out of a full complement of fifty-four teeth (twenty-seven being omitted), whereas the driven gear 23 has thirty-six teeth, so that while they are running in mesh the driven gear turns at one and one-half times the angular velocity of the drive gear. Both the driven gear 23 and the follower 24 are secured upon a shaft 27 which constitutes the output shaft of the index mechanism and is adapted for connection, though gearing or other motion transmission means (not shown), to the gear machine work spindle or other part that is to be indexed. The rotation axis 28 of the driven unit 23, 24, 27 is parallel to axis 21 and is in perpendicular, offset, relation to axis 22. As will be understood from FIGS. 1 and 5, the arrangement is such that as the follower turns about its axis 28 the ends of the follower rollers adjacent the peripheral surface of the cam will move in a plane that is substantially tangent to said peripheral surface. The axes of the rollers are perpendicular to this plane and parallel to the axis 28. Referring to FIG. 5, each of the two rollers 25, 26 is rotatable on needle bearings 29 on a headed stud 31 secured to the follower 24. By means of shims 32 the rollers are positioned axially to engage the working faces of the cam without appreciable backlash or looseness. In this regard it may be explained that the worm 14 and shafts 16, 19 and 27 are journaled for rotation, in suitable bearings (not shown), in a housing or other support structure, the bearings being capable of holding the shafts against axial displacement.

Figure 3:
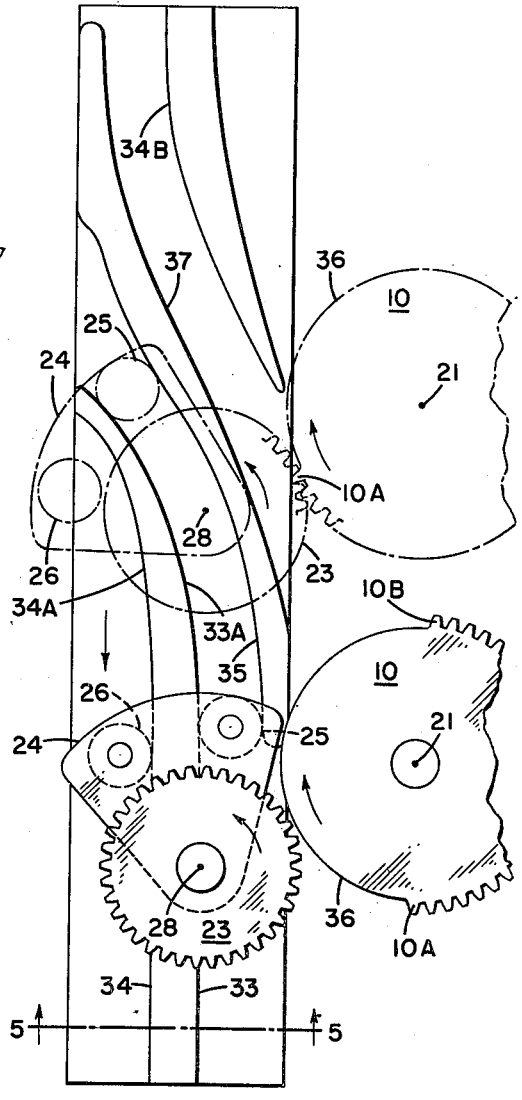
FIG. 3 is a view transverse of the driven unit, showing the cam in development into a plane.

The periphery of the cam has two cam paths, one for each roller 25, 26. These paths are defined by cam grooves both of which are open at both ends of the cam. The sides of the grooves upon which the rollers bear constitute the working faces of the cam and are inclined in a plane containing the axis of the cam, in correspondence with the conical taper of the rollers, as shown in FIG. 5. To simplify and thereby clarify the illustration, this inclination and taper are not shown in FIGS. 3 and 4, where the cam's working faces are illustrated as being perpendicular to the drawing plane. The shapes of these working faces and their relation to the driven gear 23 and the cam follower 24 will appear from the following description of one cycle of operation of the index, during which the cam is rotated through two complete turns by the motor 12, the cycle starting with the position shown in FIG. 1 and in full lines in FIG. 3.

In this starting position the rollers 25, 26 are at the end (the upper end as viewed in FIG. 3) of the lock-up or dwell portion of the cam constituted by the straight sections of working faces 33 and 34. Rotation of the cam, counterclockwise in FIG. 1 and downwardly in FIG. 3, causes the curved working face section 33A and curved working face section 35 to act on roller 25 to swing the follower and driven gear assembly 24, 23 counterclockwise with smoothly increasing velocity. Maximum velocity is attained when the assembly 23, 24, 27 has been swung through forty-five degrees. At this instant the pitch line velocity of the driven gear is equal to that of the drive gear 10, and the first tooth 10A of the latter, at the counterclockwise end of cut-out 36, comes into contact with a tooth of the driven gear. The relationship at this instant is as shown by the broken line position of gears 10, 23 and follower assembly 24, 25, 26 in FIG. 3. In this position the roller 26 has swung clear of curved working face section 34A.

In continuation of the motion, the assembly 23, 24, 27 is driven by the gear 10, the follower roller 25 being swung clear of working face sections 33A, 35. This gear drive phase continues through one complete revolution of cam 11 and through three-quarters of a turn of assembly 23, 24, 27. It ends at the moment the last tooth 10B of gear 10, at the clockwise end of cut-out 36, disengages the driven gear 23. The relationship of the cam follower 24, 25, 26 and gears 10, 23 at this instant is as they are shown in broken lines in FIG. 4. At this instant the roller 26 comes into driven engagement between working surfaces 37 and 34B which are so shaped as to smoothly decelerate the driven assembly 23, 24, 27 to a standstill. This latter condition is reached when the rollers 25 and 26 respectively engage the bottom portion (in FIG. 3) of the straight sections 33 and 34 of the working faces of the cam. The deceleration phase extends through forty-five degrees of rotation of the driven assembly, and one hundred twenty degrees of cam rotation. Then there follows the dwell of the driven assembly, occurring while the cam turns through another one hundred twenty degrees at the conclusion of which the parts are again in the relative position shown in FIG. 1 and in full lines in FIG. 3. During the dwell period the working surfaces 33, 34 of the cam hold the driven assembly 23, 24, 27 against any rotation whatever.

In FIG. 2, which compares the angular velocity of the drive gear 10 with that of the driven assembly, it is assumed that the gear 10 is being rotated at a constant velocity V by motor 12. During the first 60° of its rotation (while the cam rotates through 120°), the driven assembly 23, 24, 27 is smoothly accelerated from a standstill to a maximum velocity of 1.5 V. During the next 180° of rotation of gear 10 (ending at the 240° position in FIG. 2) the driven assembly rotates at this maximum velocity. During the next 60° of rotation of gear 10 (ending at the 300° position) the driven assembly is decelerated to a standstill, at which it remains during the final 60° of rotation of member 10.

The cam is preferably so shaped that its drive of the cam follower slightly overlaps the drive of the driven gear 23 by drive gear 10. That is, the active surface section 35 is so shaped that for a short time after the position shown in broken lines in FIG. 3, i.e. after the 60° position of FIG. 2, it drives the follower roller 25 at the same velocity about axis 28 as the drive gear 10 is driving the driven gear 23; and active surface section 37 is so shaped that for a short time before the position of FIG. 4 is reached, i.e. shortly before the 240° position of FIG. 2, the active surface section 37 drives the roller 26 at this same angular velocity.

In an usual application of the index mechanism to a gear cutting machine the motor 12 will be stopped, while the dwell surfaces 33, 34 are holding the driven assembly against rotation, for whatever period of time may be required for the gear tooth cutting operation. Preferably such stoppage will occur during a mid-portion of the dwell, so that any variation in the position in which the cam 11 stops will not affect the position of the shaft 27. That is, the position of this shaft will be the same for any position of cam 11 throughout its one hundred twenty degrees of travel between the beginning and the end of the dwell.

Either the drive gear 10 or the driven gear 23, or both, may be a gear segment, i.e. have teeth omitted therefrom, the only requirement in this respect being that these gears drive for that part of each revolution of the driven assembly in which the cam is not the driver. It is preferred however, that the drive gear 10 be a gear segment, and in this case it is necessary that the pitch diameter of the drive gear be a multiple of the pitch diameter of the driven gear. If the driven gear 23 is the segment, and the drive gear 10 is a complete gear, this diameter relationship is not required.

Having now described the preferred embodiment of my inventive concept, and its mode of operation, I claim as my invention:

1. An intermittent index mechanism comprising a drive gear, a cam, and a common drive for rotating them in constant velocity ratio; and a rotatable driven unit comprising a driven gear for mesh with the drive gear and a follower roller for engagement with the cam; one of said gears being a gear segment; the cam being of substantially drum shape and having about its peripheral surface a path for engagement by the follower during a portion of each revolution of the driven unit, the driven unit being so disposed relative to the cam that as it revolves the portion of the follower that is adjacent said peripheral surface during such engagement moves substantially in a plane tangent to said peripheral surface; the cam path being so shaped and related to the follower and the driven gear that during each operating cycle of the mechanism said cam path comes into engagement with the follower while the driven gear is in mesh with the drive gear, decelerates the driven unit to a standstill after the driven gear passes out of mesh with the drive gear, holds the driven unit stationary while the cam rotates through a certain angle, accelerates the driven unit to bring the driven gear to the same pitch line velocity as the drive gear by the time they again come into mesh, and then disengages the follower to enable further rotation of the driven unit by the drive gear.

2. A mechanism according to claim 1 in which the follower comprises two rollers having their axes parallel to the axis of rotation of the driven unit, said rollers being adapted for rolling engagement with opposed surfaces of the dwell portion of the cam path that acts to hold the driven unit stationary.

3. A mechanism according to claim 1 in which said cam, cam follower, drive gear and driven gear are so related as to cause the cam to make a plurality of complete revolutions and the driven assembly to make one complete revolution during each operating cycle of the mechanism.

4. A mechanism according to claim 1 in which the cam is so shaped as to rotate the follower at the same angular velocity that the drive gear is driving the driven gear after the gears come into mesh and also before the gears pass out of mesh.

5. A mechanism according to claim 1 wherein the axes of rotation of the cam and the driven unit are perpendicular and non-intersecting.

6. A mechanism according to claim 5 wherein the drive gear is rotatable about an axis parallel to the axis of the driven unit.

7. A mechanism according to claim 6 wherein the rotation axis of the drive gear intersects the axis of the cam, and the drive gear and the cam are connected by bevel gears.

8. A mechanism according to claim 1 in which the cam and the drive gear are connected by gearing which causes the cam to rotate at twice the angular velocity of the drive gear.

9. A mechanism according to claim 1 in which said cam, drive gear and driven gear are so related that the driven assembly makes one turn for each two turns of the cam.

10. A mechanism according to claim 1 in which the cam is of drum shape and has two cam paths both of which are open at both ends of the cam, and the cam follower has two follower rollers adapted to respectively follow said cam paths.

11. A mechanism according to claim 1 in which the drive gear is the gear segment, and its pitch diameter is a multiple of the pitch diameter of the driven gear.

12. An intermittent index mechanism comprising a drive gear, a drum-shaped cam, and a common drive for rotating them in constant velocity ratio; and a rotatable driven unit comprising a driven gear for mesh with the drive gear and a follower for engagement with the cam; one of said gears being a gear segment; the driven unit being rotatable about an axis that is perpendicular to and offset from the rotation axis of the cam and is parallel to the rotation axis of the drive gear; the cam being of drum shape and having on its peripheral surface two cam paths both of which are open at both ends of the cam, and the cam follower having two follower rollers adapted to respectively follow said cam paths; the driven unit being so disposed relative to the cam that as it revolves the portions of the rollers that are adjacent to said peripheral surface while the rollers engage the cam move substantially in a plane tangent to said peripheral surface; said cam paths being so shaped and related to the follower and the driven gear that during each operating cycle of the mechanism said cam comes into engagement with the follower while the driven gear is in mesh with the drive gear, decelerates the driven unit to a standstill after the driven gear passes out of mesh with the drive gear, holds the driven unit stationary while the cam rotates through a certain angle, accelerates the driven unit to bring the driven gear to the same pitch line velocity as the drive gear by the time they again come into mesh, and disengages the follower to enable further rotation of the driven unit by the drive gear; said two cam paths presenting opposed surfaces which constitute a dwell portion of the cam and are respectively engaged by the two rollers of the follower while the driven unit is held stationary; and said cam and said drive gear and driven gear being so related that during each cycle of operation the cam turns through a plurality of complete revolutions and the driven assembly through one complete revolution.

References Cited in the file of this patent
UNITED STATES PATENTS

| | | |
|---|---|---|
| 1,098,371 | Donnelly | June 2, 1914 |
| 1,920,969 | Carpenter | Aug. 8, 1933 |
| 2,682,179 | Freeman | June 29, 1954 |
| 2,898,775 | Reid | Aug. 11, 1959 |
| 2,918,828 | Dexter | Dec. 29, 1959 |